(12) United States Patent
Tillotson et al.

(10) Patent No.: US 10,283,285 B2
(45) Date of Patent: May 7, 2019

(54) METHOD OF FORMING A CONTACT INVOLVING THE REMOVAL OF FLASH

(71) Applicant: Honeywell International Inc., Morris Plains, NJ (US)

(72) Inventors: John Kenneth Tillotson, Petoskey, MI (US); Matthew Brose, Davis, IL (US); Ian Bradley, Freeport, IL (US); Darryl Ballard, Barnardsville, NC (US)

(73) Assignee: Honeywell International Inc., Morris Plains, NJ (US)

(*) Notice: Subject to any disclaimer, the term of this patent is extended or adjusted under 35 U.S.C. 154(b) by 0 days.

(21) Appl. No.: 15/436,279

(22) Filed: Feb. 17, 2017

(65) Prior Publication Data

US 2018/0240611 A1    Aug. 23, 2018

(51) Int. Cl.
| | |
|---|---|
| *B23K 37/08* | (2006.01) |
| *B23K 101/00* | (2006.01) |
| *B23K 101/36* | (2006.01) |
| *B23K 101/38* | (2006.01) |
| *H01H 5/04* | (2006.01) |
| *H01H 1/021* | (2006.01) |
| *H01H 11/06* | (2006.01) |

(52) U.S. Cl.
CPC .............. *H01H 1/021* (2013.01); *B23K 37/08* (2013.01); *H01H 5/04* (2013.01); *H01H 11/06* (2013.01); *B23K 2101/00* (2018.08); *B23K 2101/36* (2018.08); *B23K 2101/38* (2018.08)

(58) Field of Classification Search
CPC . H01H 5/04; H01H 5/18; H01H 11/06; Y10T 29/49105; B23K 2101/00; B23K 2101/36; B23K 2101/38; B23K 37/08

USPC .................. 200/405, 275, 238, 468
See application file for complete search history.

(56) References Cited

U.S. PATENT DOCUMENTS

| | | | | |
|---|---|---|---|---|
| 2,805,297 A | * | 9/1957 | Campbell | H01H 13/38 200/407 |
| 2,806,215 A | * | 9/1957 | Redslob | H01R 4/62 174/84 C |
| 3,172,972 A | | 3/1965 | Schleicher | |
| 3,847,323 A | * | 11/1974 | Good | B23D 79/021 228/115 |
| 4,157,525 A | * | 6/1979 | Grable | H01H 37/5418 29/622 |
| 4,308,446 A | * | 12/1981 | Okane | B23K 9/013 219/123 |
| 4,442,182 A | * | 4/1984 | Chart | H01R 11/26 148/527 |

(Continued)

FOREIGN PATENT DOCUMENTS

JP    2001047514 A    2/2001

*Primary Examiner* — Vanessa Girardi
(74) *Attorney, Agent, or Firm* — Craige Thompson; Thompson Patent Law

(57) ABSTRACT

Embodiments relate generally to systems and methods for preventing arcing within a snap action switch, particularly by removing a portion of a contact carrier attached to a stationary contact. A method of forming a contact for use in a snap action switch may comprise welding a contact onto a contact carrier; trimming at least one edge of the contact carrier proximate to the contact; and installing the contact carrier into a snap action switch housing. Trimming the at least one edge of the contact carrier may also comprise removing flash formed during the welding of the contact to the contact carrier.

13 Claims, 4 Drawing Sheets

(56) References Cited

U.S. PATENT DOCUMENTS

| | | | |
|---|---|---|---|
| 4,689,451 A | 8/1987 | Resh | |
| 4,717,795 A * | 1/1988 | Urban | H01H 13/36 |
| | | | 200/275 |
| 6,121,561 A * | 9/2000 | Sweeney | H01H 13/063 |
| | | | 200/302.1 |
| 7,105,763 B2 | 9/2006 | Adams et al. | |

* cited by examiner

METHOD OF FORMING A CONTACT INVOLVING THE REMOVAL OF FLASH

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Snap action switches may be used in a number of applications for measuring physical movement of an object or objects. The snap action switch may include a portion designed to contact the object to detect the movement via physical contact. Additionally, the snap action switch may comprise an indicator for a particular detection, such as an alarm or alert when a certain movement is detected. Snap action switches may be used in control systems, compliance detection systems, safety interlock systems, counting objects passing a point, and determining the presence or absence, passing, positioning, and end of travel of an object.

SUMMARY

In an embodiment, a method of forming a contact for use in a snap action switch may comprise forming a contact onto a contact carrier; trimming at least one edge of the contact carrier proximate to the contact; and installing the contact carrier into a snap action switch housing.

In an embodiment, a snap action switch may comprise an enclosed housing; a first spring configured to be moved by an actuator extending from the enclosed housing; a second spring configured to apply a bias to the first spring; at least one stationary contact located proximate to the second spring; a trimmed contact carrier attached to the at least one stationary contact, wherein a portion of the contact carrier proximate to the stationary contact is trimmed; a moveable contact attached to the first spring, and configured to contact and move away from the stationary contact based on the movement of the first spring.

In an embodiment, a method of forming a contact for use in a snap action switch may comprise attaching a contact to a contact carrier, wherein the contact comprises a material different from that of the contact carrier; removing material from at least one edge of the contact carrier proximate to the contact; and shaping the edge of the contact carrier proximate to the contact.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1A:
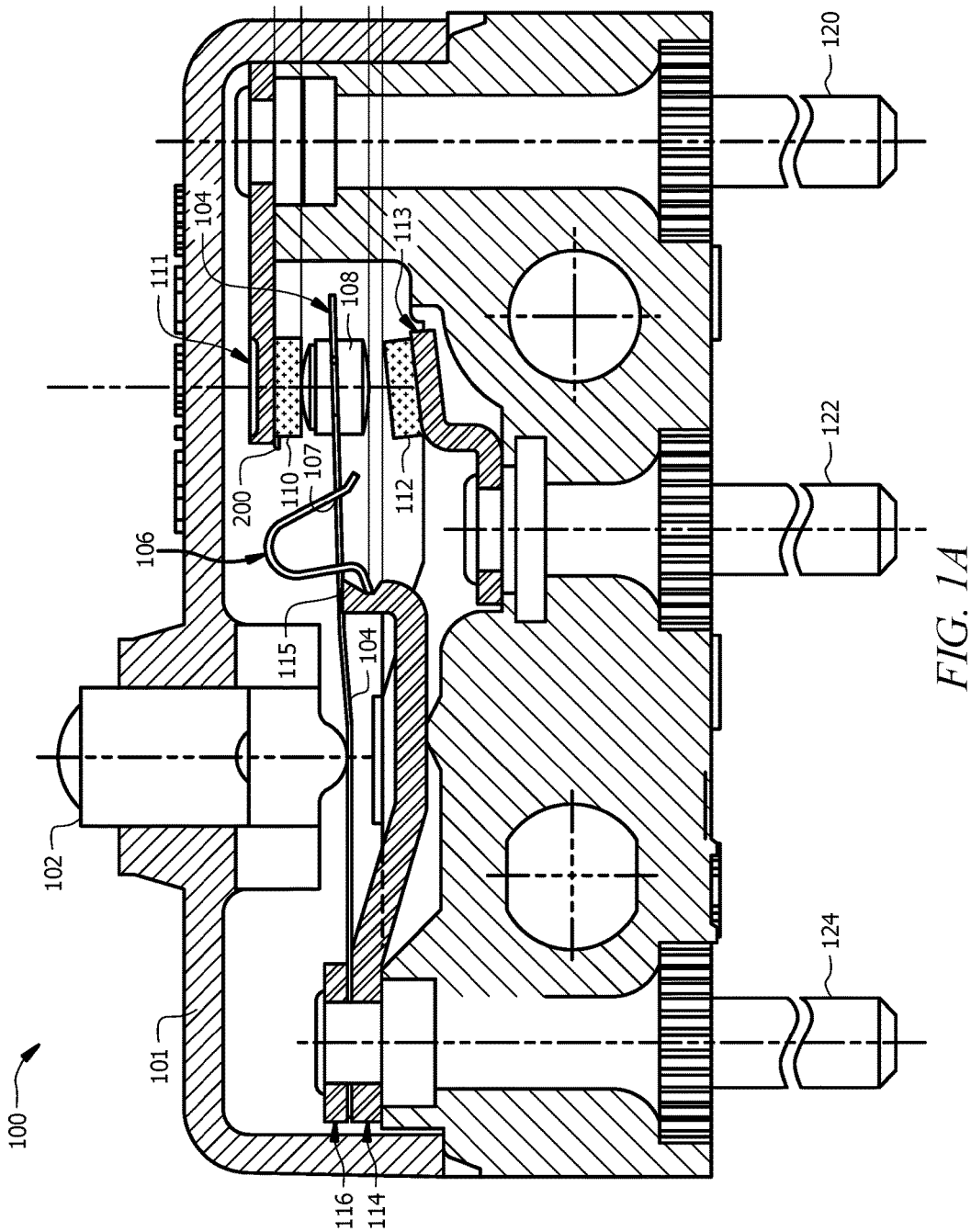
FIG. 1A illustrates a cross-sectional view of a snap action switch according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

The following brief definition of terms shall apply throughout the application:

The term "comprising" means including but not limited to, and should be interpreted in the manner it is typically used in the patent context;

The phrases "in one embodiment," "according to one embodiment," and the like generally mean that the particular feature, structure, or characteristic following the phrase may be included in at least one embodiment of the present invention, and may be included in more than one embodiment of the present invention (importantly, such phrases do not necessarily refer to the same embodiment);

If the specification describes something as "exemplary" or an "example," it should be understood that refers to a non-exclusive example;

The terms "about" or "approximately" or the like, when used with a number, may mean that specific number, or alternatively, a range in proximity to the specific number, as understood by persons of skill in the art field; and If the specification states a component or feature "may," "can," "could," "should," "would," "preferably," "possibly," "typically," "optionally," "for example," "often," or "might" (or other such language) be included or have a characteristic, that particular component or feature is not required to be included or to have the characteristic. Such component or feature may be optionally included in some embodiments, or it may be excluded.

Embodiments of the disclosure include systems and methods for preventing unwanted arcing within a snap action switch. In some snap action switches, unwanted arcing may occur to internal components of the switch, particularly the C-spring, which may be overheated and damaged by the unwanted arcing.

Typically, welded construction of contacts has been used to reduce the precious metal content. While welding reduces the overall cost of the contact, there are difficulties with this approach. Welding to an edge is difficult and thus there is typically an overhang beyond the contact after welding is completed. Additionally, the weld process occasionally leaves flash and/or splatter which further contributes to unwanted arcing in an unpredictable manner. The flash and/or splatter may act as an antenna for arcing within the switch.

Embodiments of the disclosure include methods and systems for removing the overhang along with any flash formed during the welding of the contact. After the weld is accomplished, the overhang, along with any flash, may be trimmed flush with the profile of the contact. The machine that welds the contact assembly may be modified to include an additional stage to the progressive die to shear off the overhang (and flash) after welding.

A silver contact may be welded to a brass contact carrier during the manufacturing of the components of the snap action switch. Because of the nature of the welding process, silver flash may be present after the welding. When the contact is used in a switch, the silver flash may act as an antenna, promoting arcing to other components within the switch, particularly components that are located near to the contact (such as the C-spring). Removal of the flash may reduce or eliminate the arcing.

In testing the electrical endurance of the switch, it was discovered that arcing from one or more contacts to other components in the switch caused degradation of those components. For example, the C-spring may be overheated and damaged. Then, trimmed contacts were included in the testing and showed improved results, where four units built with trimmed contacts completed 25 k cycles successfully.

Figure 1B:
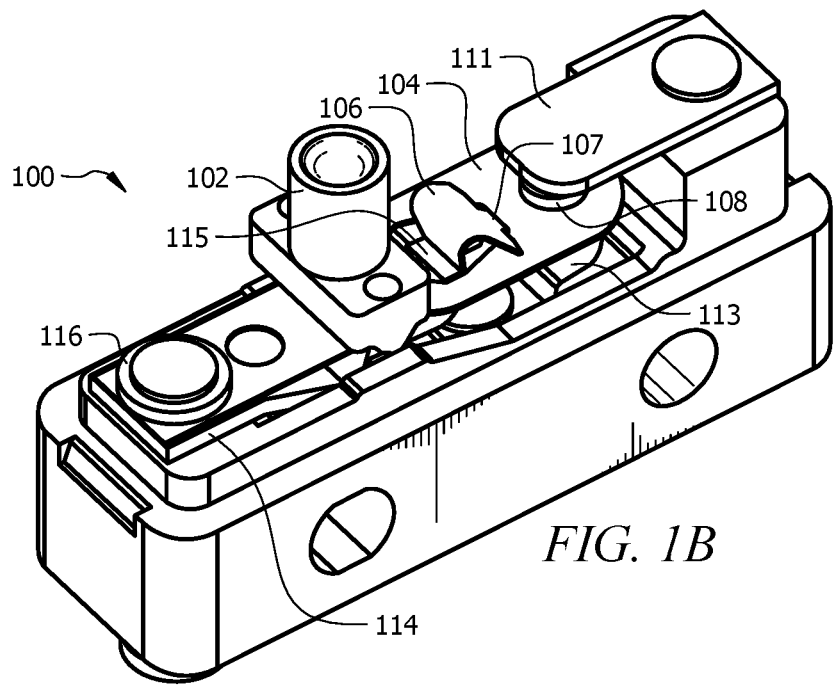
FIGS. 1B-1C illustrate perspective views of the snap action switch according to an embodiment of the disclosure.
Figure 1C:
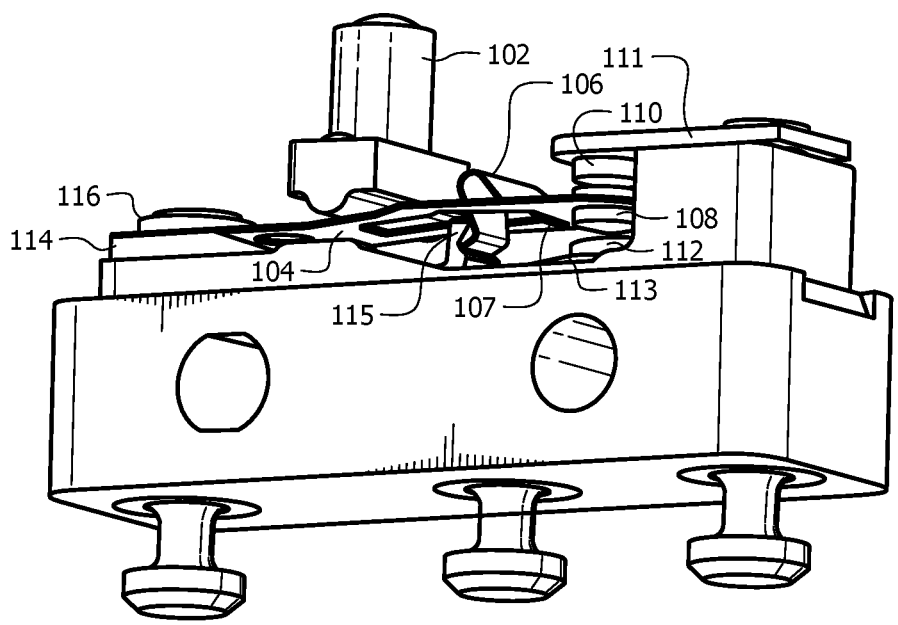

FIGS. 1A-1C illustrate views of an exemplary snap action switch 100, where FIG. 1A is a cross-sectional view, and where FIGS. 1B-1C are shown with a top housing 101 removed. The snap action switch 100 may comprise a housing 101 and an actuator 102 configured to fit within a portion of the housing 101 while passing through the housing 101. The actuator 102 may comprise a plunger configured to transfer force applied to the actuator 102 to a first spring 104. The first spring 104 may be a flat spring or "snap action" spring. A first end of the first spring 104 may be held in place between an anchor 114 and a washer 116. The first spring 104 may be attached to a second spring 106, which may comprise a C-spring. In some embodiments, the first spring 104 may be attached to the second spring 106 at a front portion 107 of the second spring 106. The anchor 114 may extend and comprise a support 115 configured to support a portion of the second spring 106, where the second spring may be attached to the support 115 at one end and to the first spring 104 at the other end 107. The first spring 104 may comprise an opening configured to fit around the support 115 and/or a portion of the second spring 106, so that the first spring 104 may move downward (rotationally) under the influence of the actuator 102.

The first spring 104 may attach to a moveable contact 108, wherein the moveable contact 108 may be configured to move in a rotational direction based on the movement of the first spring 104. The moveable contact 108 may be positioned between a first stationary contact 110 and a second stationary contact 112. Based on the movement of the flat spring 104 (via the actuator 102), the moveable contact 108 may be moved into contact with one of the first stationary contact 110 or the second stationary contact 112. Different indications, actions, and/or communications may be initiated based on the position of the moveable contact 108. In some embodiments, the first stationary contact 110 may comprise a "normally closed" contact. In some embodiments, the second stationary contact 112 may comprise a "normally open" contact.

The second spring 106 serves to bias the first spring 104, and the moveable contact 108 with the first spring 104, to a predetermined position in the absence of an input force from the actuator 102. For example, the second spring 106 can provide a force on the first spring 104 to bias the moveable contact 108 into contact with the stationary contact 110 in the absence of an input force from the actuator 102. An input force from the actuator 102 can then move the moveable contact 108 into contact with another stationary contact (e.g., the second stationary contact 112) in a snap action. Release of the force from the actuator 102 can then result in the moveable contact 108 moving with snap action back to the initial stationary contact due to the bias force from the second spring 106.

The first stationary contact 110 may be attached to a first contact carrier 111, and the second stationary contact 112 may be attached to a second contact carrier 113. The contact carriers 111 and 113 may be configured to hold the contacts 110 and 112 in place, and to connect the contacts 110 and 112 to a first pin 120 and a second pin 122 extending from the housing 101 of the snap action switch 100. Additionally, the first spring 104, second spring 106, and/or anchor 114 may provide a connection between the moveable contact 108 and a third pin 124 extending from the housing 101 of the snap action switch 100.

The first stationary contact 110 may be formed onto the first contact carrier 111 via welding. During welding, flash 200 may be formed between the first stationary contact 110 and the first contact carrier 111. The term "flash" may refer to any formation of material that extends from the contact 110, which may include flash and/or splatter depending of the techniques used to form and attach the contact 110 and the contact carrier 111. The flash 200 may comprise a thin section of metal extending from the first stationary contact 110, which may act as an antenna to direct an arc toward and/or attract an arc from the C-spring 106. Although the flash 200 may comprise a small amount of material, the arc dynamics within the enclosed housing 101 of the snap action switch 100 may allow for arcing to occur due to the flash 200. Additionally, the positioning of the C-spring 106 near the first stationary contact 110 may increase the likelihood of arcing between them.

Arcing between the first stationary contact 110 and the C-spring 106 may overheat the C-spring 106 and damage the functional aspects of the C-spring 106, thereby affecting the performance of the overall snap action switch 100.

Figure 2:
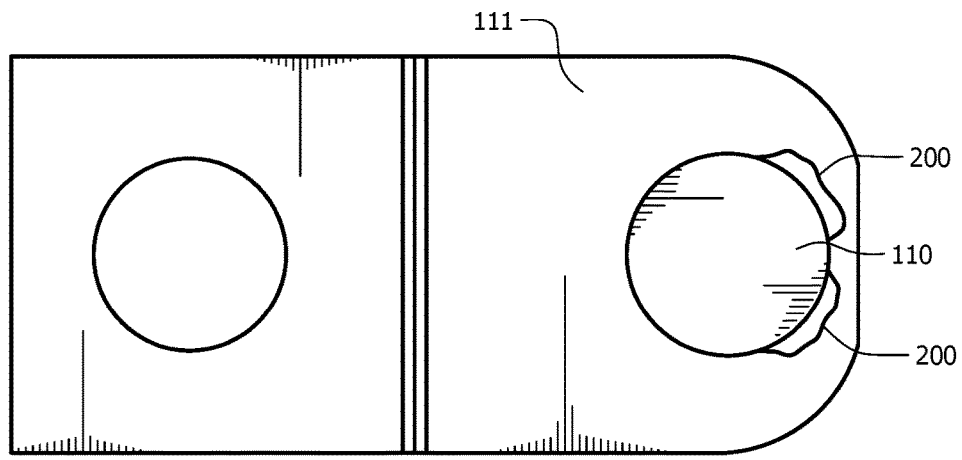
FIG. 2 illustrates a top view of a stationary contact according to an embodiment of the disclosure.

FIG. 2 illustrates a top view of an exemplary first stationary contact 110 and contact carrier 111. Traditional contact carriers 111 may comprise the shape illustrated in FIG. 2. When the contact 110 is welded and formed onto the contact carrier 111, the material of the contact 110 may splatter and/or extrude out from the interface between the contact 110 and the contact carrier 111 forming a flash 200. In some embodiments, the contact 110 may comprise a material different than that of the contact carrier 111. The flash 200 may be formed near the edge of the contact carrier 111 about the stationary contact 110, and/or the flash 200 may extend beyond the edge of the contact carrier 111. It may be desired to remove the flash 200, and possibly to remove portions of the contact carrier 111, so that the likelihood of arcing from the flash 200 is reduced.

Figure 3A:
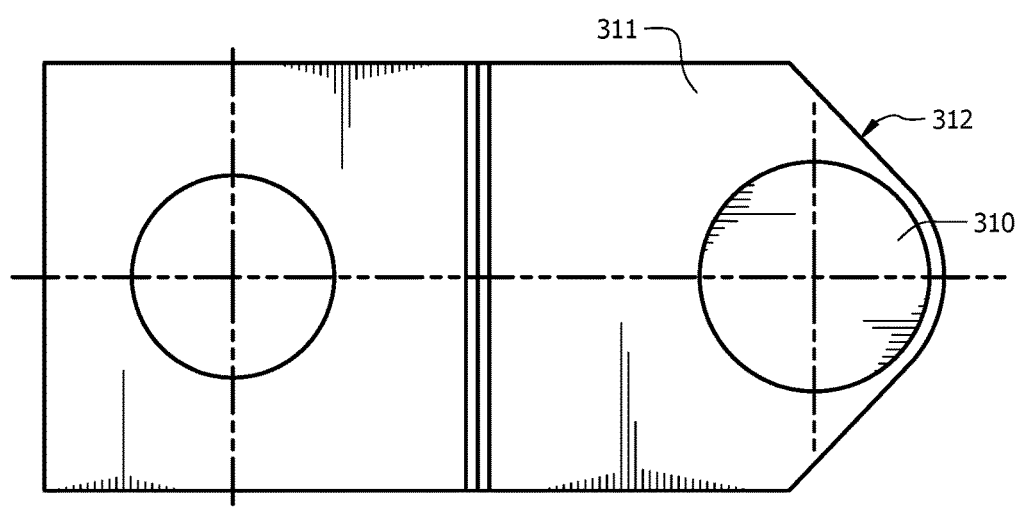
FIG. 3A illustrates a top view of a trimmed stationary contact according to an embodiment of the disclosure.
Figure 3B:
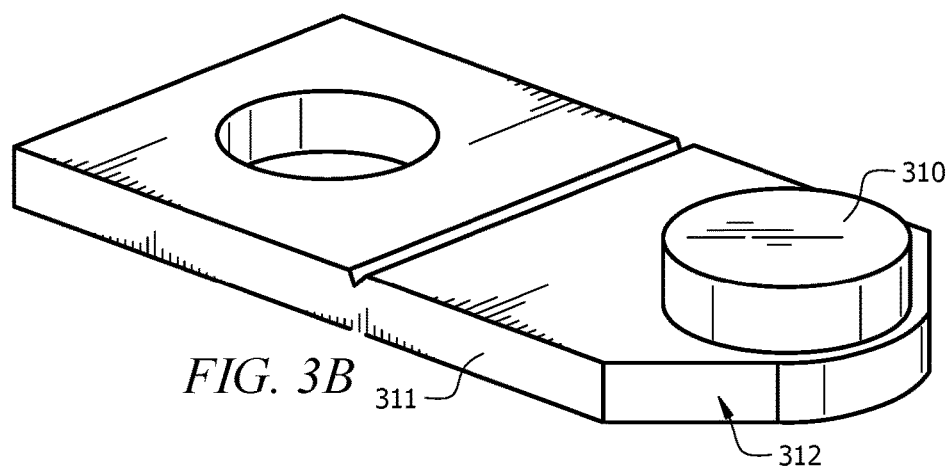
FIG. 3B illustrates a perspective view of a trimmed stationary contact according to an embodiment of the disclosure.
Figure 3C:
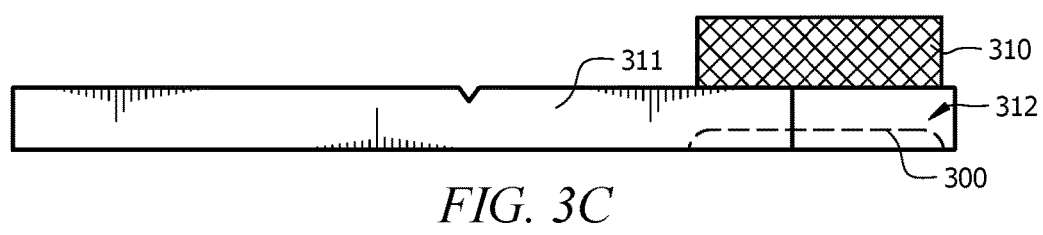
FIG. 3C illustrates a side view of a trimmed stationary contact according to an embodiment of the disclosure.

Referring to FIGS. 3A-3C, embodiments of the disclosure include a shaped contact carrier 311 that is trimmed around the edges of the stationary contact 310. The contact carrier 311 can be used as the contacts 111 and/or 113 in the snap action switch 100 of FIG. 1. After the stationary contact 310 has been formed onto the contact carrier 311, the edge 312 of the contact carrier 311 may be trimmed and shaped around the stationary contact 310. In some embodiments, the edge 312 of the contact carrier 311 may be trimmed to be flush with the stationary contact 310 around at least a portion of the stationary contact 310. In some embodiments, the edge 312 of the contact carrier 311 may be trimmed within 0.01 inches of the stationary contact 310 around at least a portion of the stationary contact 310. In some embodiments, the edge 312 of the contact carrier 311 may be trimmed at a radius of approximately 45° from the side of the contact carrier 311. In some embodiments, the trimming of the edge 312 may form an angled surface, a rounded surface, and an angled surface.

Any flash that may be formed during the attachment of the stationary contact 310 to the contact carrier 311 may be trimmed away during the trimming and shaping of the contact carrier 311. By trimming the contact carrier 311, the distance between the contact carrier 311 and other components of the snap action switch (such as a C-spring) may be increased, thereby decreasing the likelihood of arcing between the components.

A method may comprise forming a contact onto a contact carrier, wherein the contact may comprise a material different from that of the contact carrier. Then, the edge of the contact carrier may be trimmed around the shape of the contact, wherein any flash that may have been left around the edges of the contact may be trimmed during the trimming of the contact carrier.

In a first embodiment, a method of forming a contact for use in a snap action switch may comprise forming a contact onto a contact carrier; trimming at least one edge of the contact carrier proximate to the contact; and installing the contact carrier into a snap action switch housing.

A second embodiment can include the method of the first embodiment, wherein the contact comprises a material different from that of the contact carrier.

A third embodiment can include the method of the first or second embodiments, wherein forming the contact onto the contact carrier comprises welding.

A fourth embodiment can include the method of any of the first to third embodiments, wherein trimming comprises removing flash formed during the forming of the contact onto the contact carrier.

A fifth embodiment can include the method of any of the first to fourth embodiments, wherein trimming comprises removing a portion of the contact carrier proximate to the contact.

A sixth embodiment can include the method of any of the first to fifth embodiments, wherein trimming comprises forming an edge of the contact carrier that is flush with at least a portion of the contact.

A seventh embodiment can include the method of any of the first to sixth embodiments, wherein trimming comprises forming an edge of the contact carrier that is within 0.01 inches of at least a portion of the contact.

An eighth embodiment can include the method of any of the first to seventh embodiments, wherein installing the contact carrier into a snap action switch comprises installing the stationary contact proximate to a C-spring within the snap action switch.

A ninth embodiment can include the method of any of the first to eighth embodiments, wherein forming the contact onto the contact carrier comprises extruding material out from the interface between the contact and the contact carrier, and wherein trimming comprises removing the extruded material.

In a tenth embodiment, a snap action switch may comprise an enclosed housing; a first spring configured to be moved by an actuator extending from the enclosed housing; a second spring configured to apply a bias to the first spring; at least one stationary contact located proximate to the second spring; a trimmed contact carrier attached to the at least one stationary contact, wherein a portion of the contact carrier proximate to the stationary contact is trimmed; a moveable contact attached to the first spring, and configured to contact and move away from the stationary contact based on the movement of the first spring.

An eleventh embodiment can include the snap action switch of the tenth embodiment, wherein a portion of the contact carrier proximate to the stationary contact is trimmed after the stationary contact is attached to the contact carrier.

A twelfth embodiment can include the snap action switch of the tenth or eleventh embodiments, wherein a trimmed edge of the contact carrier is within 0.01 inches of at least a portion of the contact.

A thirteenth embodiment can include the snap action switch of any of the tenth to twelfth embodiments, wherein a trimmed edge of the contact carrier is flush with at least a portion of the contact.

A fourteenth embodiment can include the snap action switch of any of the tenth to thirteenth embodiments, wherein the trimmed edge comprises a rounded surface proximate to the stationary contact.

A fifteenth embodiment can include the snap action switch of any of the tenth to fourteenth embodiments, wherein the at least one stationary contact comprises silver and wherein the contact carrier comprises brass.

In a sixteenth embodiment, a method of forming a contact for use in a snap action switch may comprise attaching a contact to a contact carrier, wherein the contact comprises a material different from that of the contact carrier; removing material from at least one edge of the contact carrier proximate to the contact; and shaping the edge of the contact carrier proximate to the contact.

A seventeenth embodiment can include the method of the sixteenth embodiment, further comprising extruding a flash material from the interface between the contact and the contact carrier.

An eighteenth embodiment can include the method of the seventeenth embodiment, further comprising removing the flash material along with the material of the contact carrier.

A nineteenth embodiment can include the method of any of the sixteenth to eighteenth embodiments, wherein attaching the contact to the contact carrier comprises welding a silver contact to a brass contact carrier.

A twentieth embodiment can include the method of any of the sixteenth to nineteenth embodiments, wherein removing material comprises forming an edge of the contact carrier that is within 0.01 inches of at least a portion of the contact.

While various embodiments in accordance with the principles disclosed herein have been shown and described above, modifications thereof may be made by one skilled in the art without departing from the spirit and the teachings of the disclosure. The embodiments described herein are representative only and are not intended to be limiting. Many variations, combinations, and modifications are possible and are within the scope of the disclosure. Alternative embodiments that result from combining, integrating, and/or omitting features of the embodiment(s) are also within the scope of the disclosure. Accordingly, the scope of protection is not limited by the description set out above, but is defined by the claims which follow, that scope including all equivalents of the subject matter of the claims. Each and every claim is incorporated as further disclosure into the specification and the claims are embodiment(s) of the present invention(s). Furthermore, any advantages and features described above may relate to specific embodiments, but shall not limit the application of such issued claims to processes and structures accomplishing any or all of the above advantages or having any or all of the above features.

Additionally, the section headings used herein are provided for consistency with the suggestions under 37 C.F.R. 1.77 or to otherwise provide organizational cues. These headings shall not limit or characterize the invention(s) set out in any claims that may issue from this disclosure. Specifically and by way of example, although the headings might refer to a "Field," the claims should not be limited by the language chosen under this heading to describe the so-called field. Further, a description of a technology in the "Background" is not to be construed as an admission that certain technology is prior art to any invention(s) in this disclosure. Neither is the "Summary" to be considered as a limiting characterization of the invention(s) set forth in issued claims. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of the claims shall be considered on their own merits in light of this disclosure, but should not be constrained by the headings set forth herein.

Use of broader terms such as "comprises," "includes," and "having" should be understood to provide support for narrower terms such as "consisting of," "consisting essentially of," and "comprised substantially of." Use of the terms "optionally," "may," "might," "possibly," and the like with respect to any element of an embodiment means that the element is not required, or alternatively, the element is required, both alternatives being within the scope of the embodiment(s). Also, references to examples are merely provided for illustrative purposes, and are not intended to be exclusive.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of forming a contact for use in a snap action switch, the method comprising:
    forming a contact onto a contact carrier;
    forming flash on the contact carrier, wherein the flash is positioned to extend from the contact along the contact carrier;
    trimming at least one edge of the contact carrier proximate to the contact, wherein the trimming comprises removing the flash and a portion of the contact carrier proximate to the contact; and
    installing the contact carrier into a snap action switch housing.

2. The method of claim 1, wherein the contact comprises a material different from that of the contact carrier.

3. The method of claim 1, wherein forming the contact onto the contact carrier comprises welding.

4. The method of claim 1, wherein forming the contact onto the contact carrier comprises welding a silver contact to a brass contact carrier.

5. The method of claim 1, wherein the trimming further comprises forming an edge of the contact carrier that is flush with at least a portion of the contact.

6. The method of claim 1, wherein the trimming further comprises forming an edge of the contact carrier that is within 0.01 inches of at least a portion of the contact.

7. The method of claim 1, wherein installing the contact carrier into a snap action switch comprises installing the stationary contact proximate to a C-spring within the snap action switch.

8. The method of claim 1, wherein forming the contact onto the contact carrier comprises extruding material out from the interface between the contact and the contact carrier, and wherein trimming comprises removing the extruded material.

9. A method of forming a contact for use in a snap action switch, the method comprising:
    attaching a contact to a contact carrier, wherein the contact comprises a material different from that of the contact carrier;
    forming flash on the contact carrier, wherein the flash is positioned to extend from the contact along the contact carrier;
    removing the flash and material of the contact carrier from at least one edge of the contact carrier proximate to the contact; and
    shaping the edge of the contact carrier proximate to the contact.

10. The method of claim 9, further comprising extruding the flash from the interface between the contact and the contact carrier.

11. The method of claim 10, wherein the forming the flash on the contact carrier comprises forming the flash adjacent to an edge of the contact carrier.

12. The method of claim 9, wherein attaching the contact to the contact carrier comprises welding a silver contact to a brass contact carrier.

13. The method of claim 9, wherein removing material comprises forming an edge of the contact carrier that is within 0.01 inches of at least a portion of the contact.

* * * * *